United States Patent
Okunseinde et al.

(10) Patent No.: US 7,206,977 B2
(45) Date of Patent: Apr. 17, 2007

(54) INTELLIGENT SELF-CONFIGURABLE ADAPTER

(75) Inventors: Folu Okunseinde, Austin, TX (US); Tyron Stading, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 474 days.

(21) Appl. No.: 10/756,130

(22) Filed: Jan. 13, 2004

(65) Prior Publication Data
US 2005/0160306 A1 Jul. 21, 2005

(51) Int. Cl.
*G06F 11/00* (2006.01)

(52) U.S. Cl. .................................... 714/47
(58) Field of Classification Search ............. 714/47, 714/4
See application file for complete search history.

(56) References Cited

U.S. PATENT DOCUMENTS

| | | | | |
|---|---|---|---|---|
| 5,331,642 | A * | 7/1994 | Valley et al. | 714/705 |
| 5,491,687 | A * | 2/1996 | Christensen et al. | 370/253 |
| 5,581,482 | A * | 12/1996 | Wiedenman et al. | 702/186 |
| 5,586,117 | A * | 12/1996 | Edem et al. | 370/466 |
| 5,612,953 | A * | 3/1997 | Olnowich | 370/367 |
| 5,991,303 | A * | 11/1999 | Mills | 370/402 |
| 6,052,371 | A * | 4/2000 | Lemieux | 370/338 |
| 6,285,659 | B1 * | 9/2001 | Feuerstraeter et al. | 370/244 |
| 6,578,191 | B1 | 6/2003 | Boehme et al. | 717/107 |
| 6,661,772 | B2 * | 12/2003 | Matsuno et al. | 370/216 |
| 6,697,336 | B1 * | 2/2004 | Socher | 370/252 |
| 6,917,594 | B2 * | 7/2005 | Feuerstraeter et al. | 370/244 |
| 2003/0018954 | A1 | 1/2003 | Ponticelli et al. | |
| 2003/0135476 | A1 | 7/2003 | Holland et al. | |
| 2003/0135609 | A1 * | 7/2003 | Carlson et al. | 709/224 |
| 2003/0172368 | A1 | 9/2003 | Alumbaugh et al. | |
| 2004/0010718 | A1 * | 1/2004 | Porras et al. | 713/201 |
| 2004/0059797 | A1 * | 3/2004 | Velan et al. | 709/219 |

* cited by examiner

*Primary Examiner*—Robert Beausoliel
*Assistant Examiner*—Amine Riad
(74) *Attorney, Agent, or Firm*—Volel Emile; Marilyn S. Dawkins

(57) ABSTRACT

An intelligent self-configurable adapter is provided. Before transferring data, the adapter configures itself. After configuring itself, the adapter then starts transmitting the data. During data transmission, the adapter monitors the connection to ensure that the transmission is within a certain performance level. If the data transfer falls below the performance level, the adapter may reconfigure itself using a recovery strategy.

18 Claims, 6 Drawing Sheets

| APPLICATION NAME | TRANSPORTS | | SECURITY |
|---|---|---|---|
| APPLICATION₁ | HTTPS | FTP | YES |
| APPLICATION₂ | JMS | | NO |
| APPLICATION₃ | HTTP | | NO |
| ... | ... | | NO |
| APPLICATIONₙ | SMTP | | NO |

FIG. 5

INTELLIGENT SELF-CONFIGURABLE ADAPTER

BACKGROUND OF THE INVENTION

1. Technical Field

The present invention is directed to business software integration. More specifically, the present invention is directed to an intelligent self-configurable adapter used in software integration.

2. Description of Related Art

With an ever-increasing number of companies doing business electronically, software integration has become more and more of a requirement. Software integration is the seamless integration of disparate applications on disparate systems to provide business solutions. Specifically, companies seeking to make information available on-demand to employees, customers, suppliers and partners are providing customized interfaces to information aggregated from disparate sources. Application developers creating these business solutions inevitably have to integrate data and functionality from existing applications with the newly-customized interfaces.

To facilitate software integration, integration-ready applications have been designed. An integration-ready application has its point (or points) of integration isolated from all layers of the application. One method that has been used to isolate an application's integration logic is to use adapters.

An adapter is a device that is used to convert data from one format into another. Thus, the adapter receives data in one format and transmits the data into another format. Traditionally, adapters were components of packaged integration software that were purchased from Enterprise Application Integration (EAI) vendors. As such, the adapters were static. A static adapter is an adapter that cannot reconfigure itself when needed. For example, suppose an adapter is configured to transfer data between one application on one system and another application on another system using HTTP (HyperText Transport Protocol). Suppose further that for some reason the data transfer fails, a static adapter may not be able to reconfigure itself to use another transport protocol to accomplish its task even if the other protocol is available.

Some recently developed adapters have been able to reconfigure themselves in cases of failure. However, reconfiguration is based on pre-defined scenarios. For example, one scenario may state that if HTTP is being used to transfer data and it fails then use UDP (User Datagram Protocol). In certain instances, these pre-defined scenarios may not be flexible enough. For example, if the adapter was not designed to take advantage of a particular scenario, even if the scenario is the best one available or it is the only one available, it will not be used.

Thus, what is needed is an intelligent self-configurable adapter that may advantageously use a best suited configuration to transfer information.

SUMMARY OF THE INVENTION

The present invention provides an intelligent self-configurable adapter. When the adapter is to transmit data between two computing devices, it first accesses a descriptor file which contains certain instructions. The instructions include which transport module that should be used to transmit the data and whether the data is to be transmitted securely. The adapter then downloads the transport module and a security module, if one is needed, and configures itself. After downloading the requisite modules and configuring itself, the adapter may then start transmitting the data.

During the data transmission, the adapter monitors the connection to ensure that the transmission is within a certain performance level. If data transmission falls below the performance level, the adapter may reconfigure itself using a recovery strategy.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 depicts an exemplary descriptor file.

DETAILED DESCRIPTION OF THE PREFERRED EMBODIMENT

Figure 1:
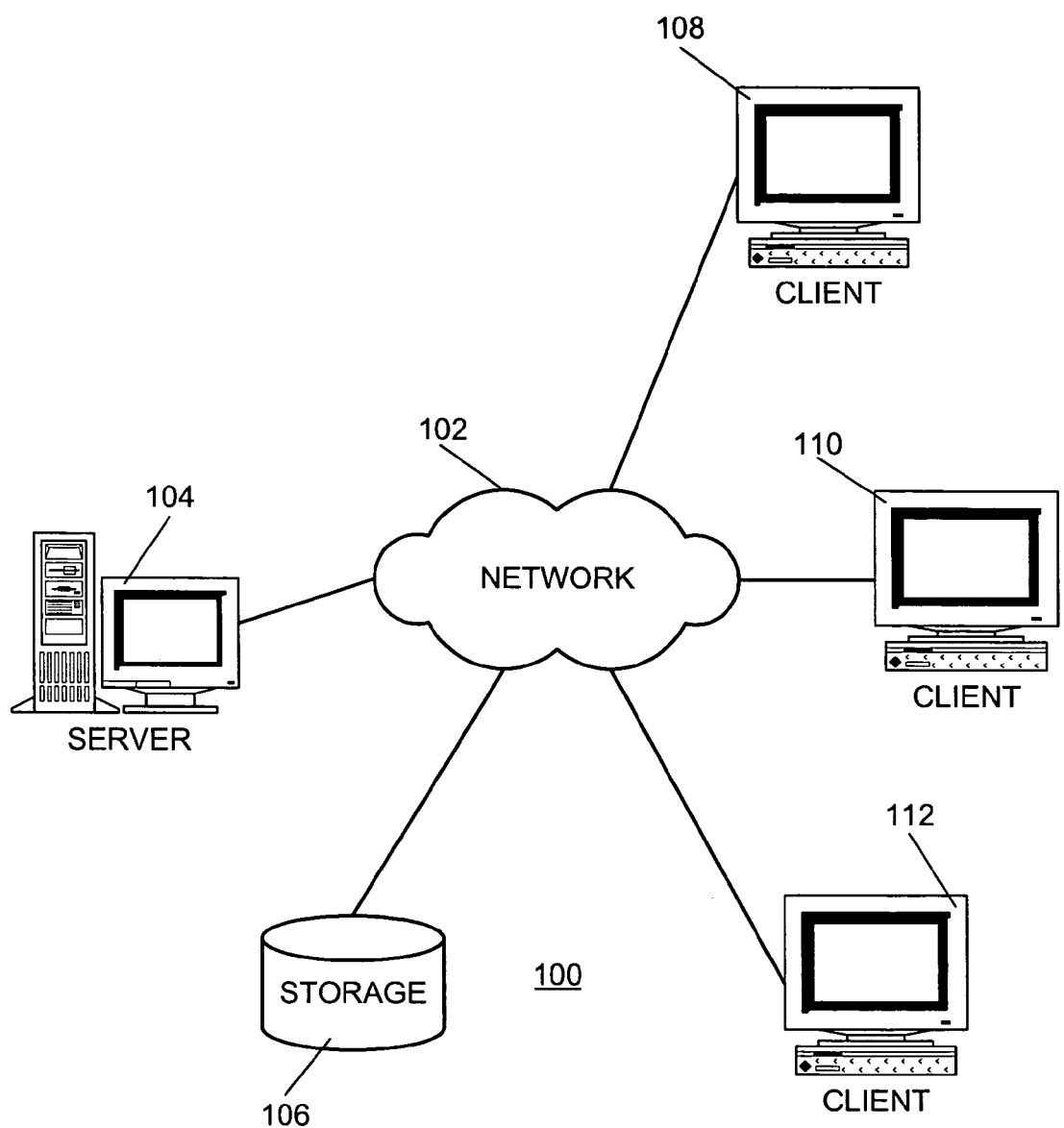
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
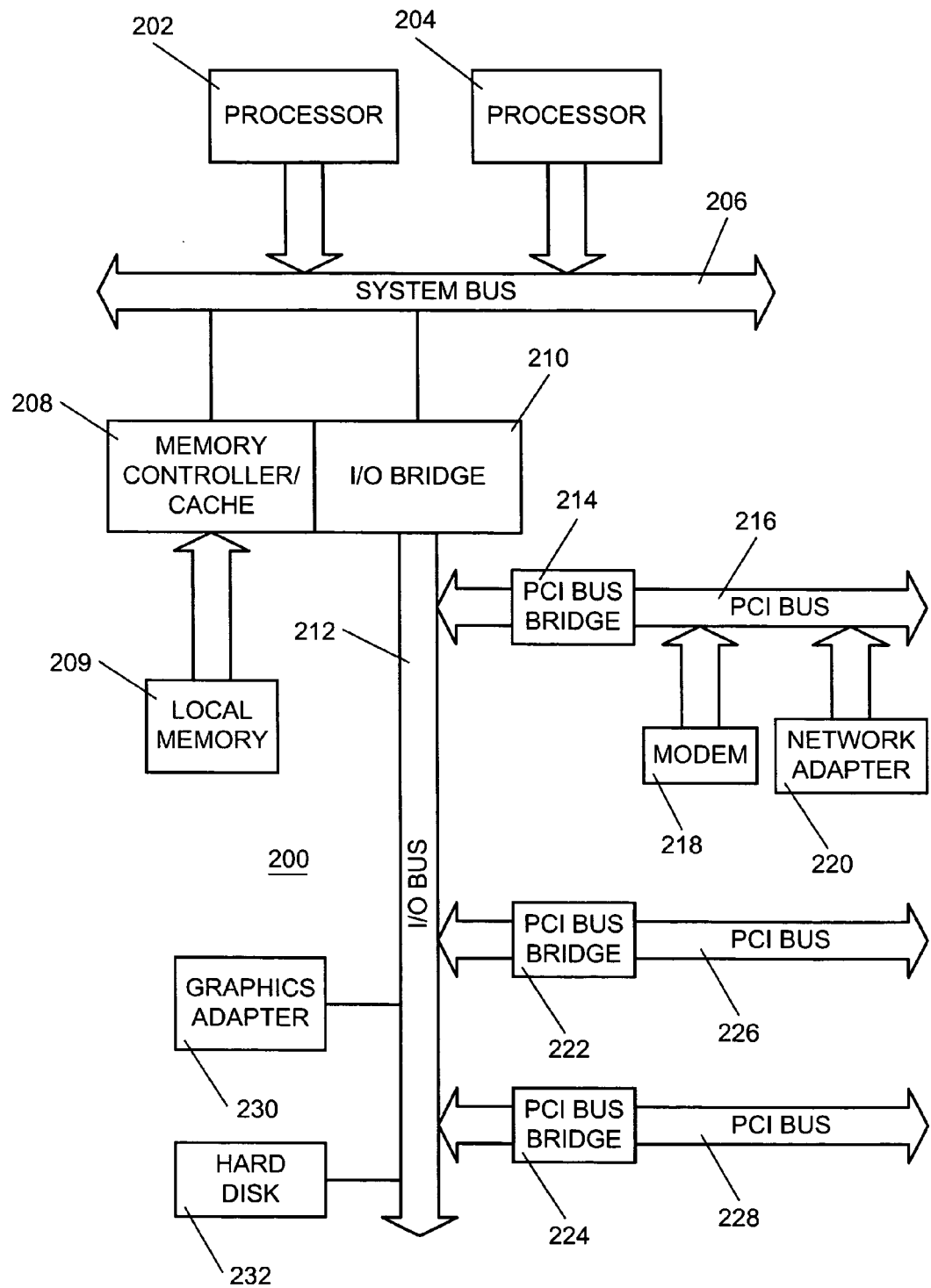
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
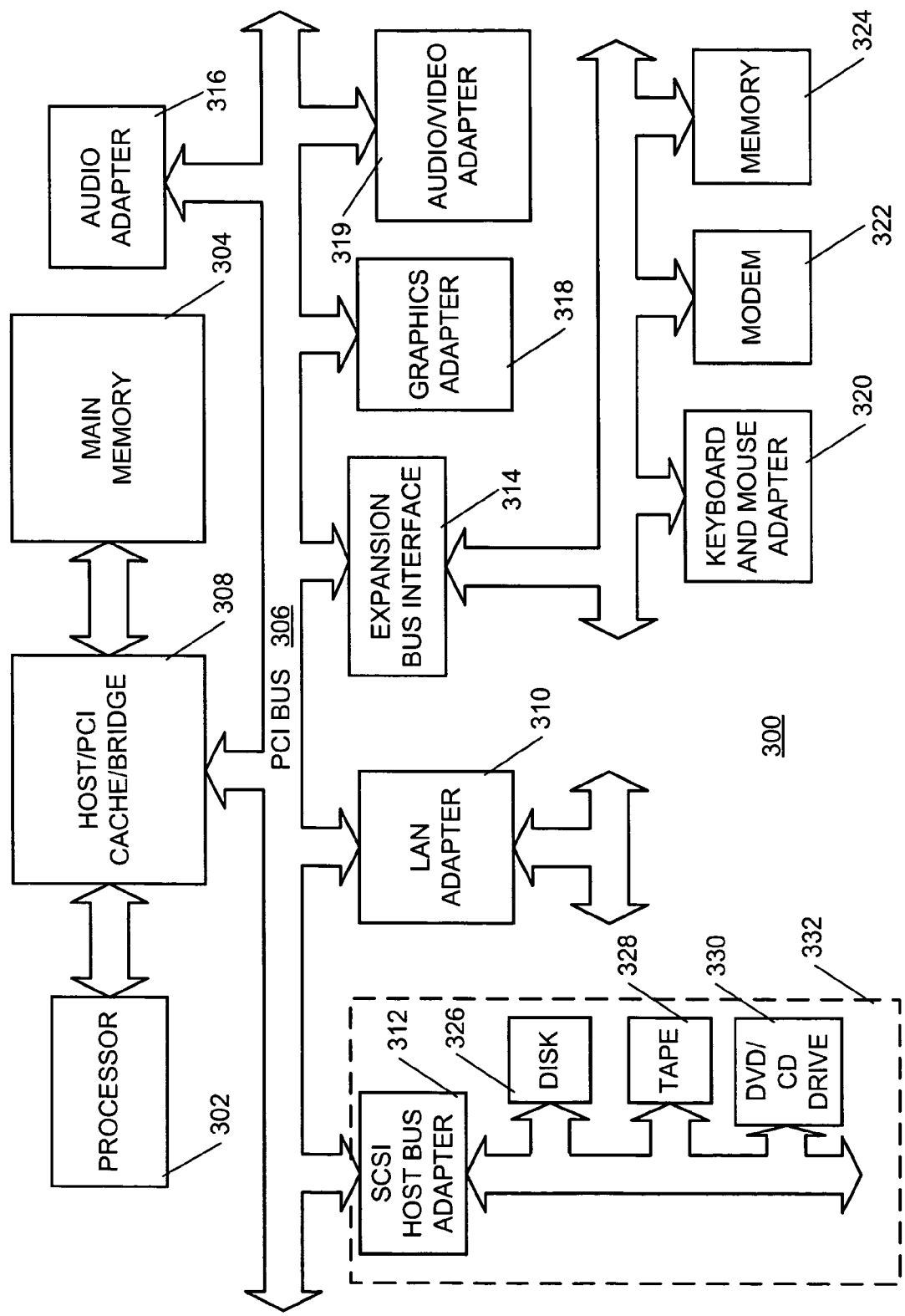
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM/DVD drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP™, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides a system, apparatus and method of implementing a self-configurable adapter. The invention may be local to client systems 108, 110 and 112 of FIG. 1 or to the server 104 or to both the server 104 and clients 108, 110 and 112. Further, the present invention may reside on any data storage medium (i.e., floppy disk, compact disk, hard disk, ROM, RAM, etc.) used by a computer system.

Figure 4:
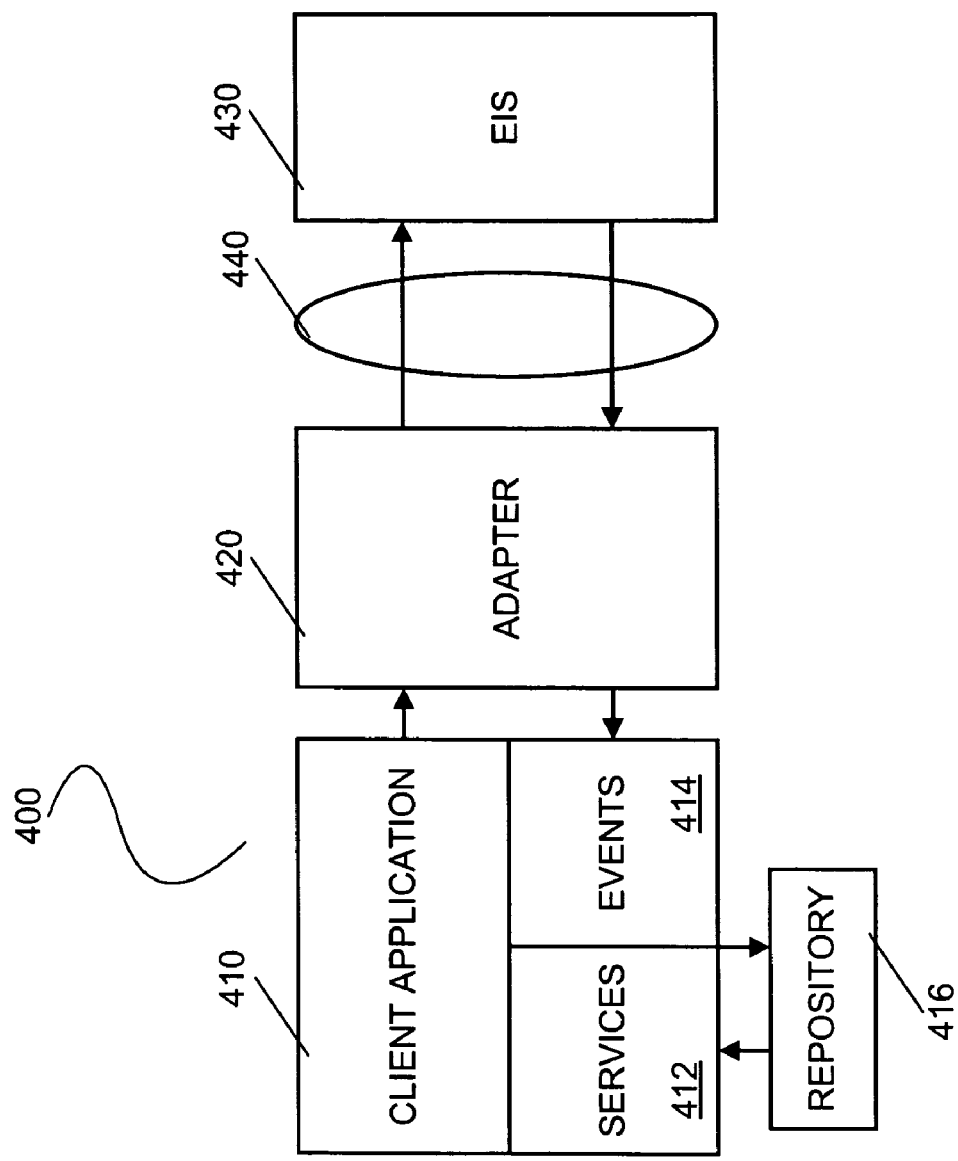
FIG. 4 depicts an exemplary application integration system.

FIG. 4 depicts an exemplary application integration system 400. The exemplary application integration system 400 includes a client application 410, a repository 416, an adapter 420 and an enterprise information system (EIS) 430. The client application 410 may be installed on any one or all of clients 108, 110 and 112 and contains a service module 412 and an event module 414. The service module 412 is used to request services and to receive responses to requests from the EIS 430. The event module is used to receive event notifications from the EIS 430.

The EIS 430 may be on server 104 and is a software module that provides information infrastructure for an enterprise. An EIS or Enterprise Information Services offers a set of services to clients through local and/or remote interfaces. In this case, these interfaces may be called adapters. Adapters are disclosed in INSTALLATION OF DATA-DRIVEN BUSINESS INTEGRATION ADAPTERS, by Gilfix et al. Ser. No. 10/392,765, filed on Mar. 19, 2003 and in DATA-DRIVEN APPLICATION INTEGRATION ADAPTERS, by Gilfix et al. Ser. No. 10/361,202, filed on Feb. 6, 2003. Both applications, as is the present invention, are assigned to IBM Corp. and the disclosure of both applications is herein incorporated by reference.

When client application 410 submits a service request to EIS 430, it is done through the adapter 420, which may be installed on client 110. The service request may be in the form of an extensible Markup Language (XML) document. When the adapter receives the XML document representing the service request, the adapter 420 uses an XML schema that is associated with the service request to translate the request to a format that the EIS 430 expects. A schema is an agreement on a common vocabulary for a particular application that involves exchanging documents. It is a model for describing structure of information.

After the adapter has translated the XML document into a format understandable by the EIS 430, the adapter 420 may forward the document to EIS 430 over network 440. Based on the location of server 104, the network 440 may be a LAN, WAN etc. The EIS 430 then ensures that the proper application on the server 104 receives the requested service. When the response to the requested service is ready, it is transferred to the adapter 420 in the form of an XML document. The adapter 420 then translates the XML document into a format understandable by the client application 410 before delivery.

Service requests may be synchronous or asynchronous. For synchronous service requests, the client application 410 may stop all activities until a response is received. For asynchronous service requests, the client application 410 may continue to perform other tasks, but polls periodically for the response or may receive the response through a callback method. Particularly, when the client application 410 places an asynchronous request, the request is not passed immediately to the adapter 420 but rather is placed, for example, into a JMS (Java Message Service) queue system. Then, a message-driven Java bean (not shown) may pull the request off the JMS queue and pass it to the adapter 420, which will translate and forward the request to EIS 430. When a response to the requested service is received by the adapter 420, it will be passed to the client application 410 by the callback method or by polling.

Event notifications are always asynchronous and are used by the EIS 430 to notify client application 410 that an unsolicited task has been completed. To receive an event notification, however, the client application 410 must have subscribed to listen for the event in a message broker queue and/or a JMS queue. Specifically, the message broker (not shown) which may be embedded in the adapter 420 uses topic files to publish the event notification. The topic file associates a topic name with a schema definition. Thus, when an XML document representing the event notification is received, it will be translated, via the schema, into a format understandable by the client application 410. (Note that all needed schemas may be stored in repository 416).

After translation, the event is sent to an event router (not shown). The event router then sends the event notification to the message broker and JMS queues. An event router is used because there may be a plurality of client applications 410 on any one of the client systems 108–112 which may have subscribed to listen for the event. Just as well, there may be a plurality of client applications 410 on any one of the client systems 108–112 which may have not subscribed to listen for the event. Thus, the router is used as an efficient method of notification delivery.

According to the present invention, the adapter 420 is a shell of an adapter. That is, the adapter 420 contains the most rudimentary software needed to download transport and/or security modules and to configure itself. Thus, before passing requests, responses and event notifications to either the EIS 430 or the client application 410, the adapter 420 must first configure itself. To do so, it may retrieve a descriptor file from a registry. The descriptor file may contain the transport information and requirements of the client application 410. For example, when the client application 410 requests a service, it does so by specifying the service name, the name of the application on the server that may perform the function and the XML document representing the request. Using the application name passed by the client application 410, the adapter 420 may properly configure itself to perform the requested task.

FIG. 5 depicts a portion of an exemplary descriptor file. The portion is a table on which the name of each application that may be used by the client application 410 is cross-referenced with one or more transports. For example, application$_1$ may use HTTPS or FTP to transfer or receive information from the EIS 430. HTTPS transfers information using HTTP over a Secure Sockets Layer (SSL) connection. SSL works by using a private key to encrypt data that is transferred over the SSL connection. By convention, URLs that require an SSL connection start with HTTPS instead of HTTP. Thus, before using HTTP to transfer the information, the adapter 420 may download an HTTP and an SSL module.

Alternatively, FTP (File Transfer Protocol) may be used. Since security is required for application$_1$ and since FTP does not provide any form of security, the adapter 420 may download from a component library a Kerberos module. Kerberos is a network authentication protocol. It is designed to provide strong authentication for client/server applications by using secret-key cryptography. A free implementation of this protocol is available from the Massachusetts Institute of Technology.

Returning to FIG. 5, JMS transport may be used for application$_2$. Application$_3$ requires a non-secure HTTP transport whereas application$_N$ requires an SMTP (Simple Mail Transfer Protocol) transport. SMTP is a protocol for sending e-mail messages between servers. Most e-mail systems that send mail over the Internet use SMTP to send messages from one server to another; the messages can then be retrieved with an e-mail client using either POP (Post Office Protocol) or IMAP (Internet Message Access Protocol).

Once the adapter downloads the proper transport module as well as any needed security module, it may configure itself for use. Then, the adapter 420 may connect with EIS 430 to send or receive the information. As the information is being sent or received, the adapter may monitor the transfer rate of the information to ensure performance and efficient communication. If communication fails or performance drops below a pre-defined level (this may be defined either in the descriptor file or in the adapter configuration file), the adapter 420 may notify the user. After notification and/or under user control, the adapter 420 may reconfigure itself based on one of different recovery methods.

One recovery method that may be used by the adapter 420 may be to update, re-arrange or turn on/off components in the existing configuration. For example, the adapter 420 may call the components in a different order. The adapter 420 may further disable security or perhaps switch encryption levels given a particular Service Level Agreement (SLA). An SLA is a contract between an Application Service Provider (ASP) and an end-user which stipulates and commits the ASP to a required level of service. An SLA should contain a specified level of service, support options, enforcement or penalty provisions for services not provided, a guaranteed level of system performance as relates to downtime or uptime, a specified level of customer support and what software or hardware will be provided and for what fee.

Another recovery strategy is to use failover. Failover is the case in which backup transport mechanisms are used. For example, in the case of application$_1$ where the adapter 420 may be using the first transport protocol (i.e., HTTPS) to transfer the data, if the transfer rate falls below performance, the adapter 420 may switch over to FTP. In that case, the adapter may pause to download the FTP module and the requisite Kerberos module and change the transport mechanism.

A further recovery strategy is to search the network or registry for alternative measures. A suitable alternative measure may be to find a descriptor file from the registry that matches the meta-data of the original descriptor file. Namely, it has to match the business object and data format of the original file. For example, if the transfer of information requires a secure connection, then a suitable descriptor file should also call for a secure connection. Further, the format of the XML document representing the information being transferred must be the same as that of the original descriptor file.

One method of searching the network is for the adapter 420 to determine whether a different server 104 suits the required integration role. For example, if the adapter is using JMS to transfer information and notices a decline in performance, it may scan port 80 (the normal http port) of the different server 104. If a file is received from port 80, the adapter may examine the message contents. Using Rosetta-Net, for example, the adapter 420 may then determine if the new message received via HTTP is comparable in type and content to the earlier message received via JMS. Using this information, the adapter 420 may then determine whether this is a suitable backup measure. Note that Rosettanet is system-to-system XML-based dialogs that define business processes between trading partners. It includes a business document with vocabulary, and a business process with the choreography of the message dialog.

Thus, if and as long as data transfers are below a performance level, the adapter 420 may continually reconfigure itself. Therefore, the adapter 420 is not restricted to any one configuration but rather uses the configuration that is best suited to transfer the information.

Figure 6:
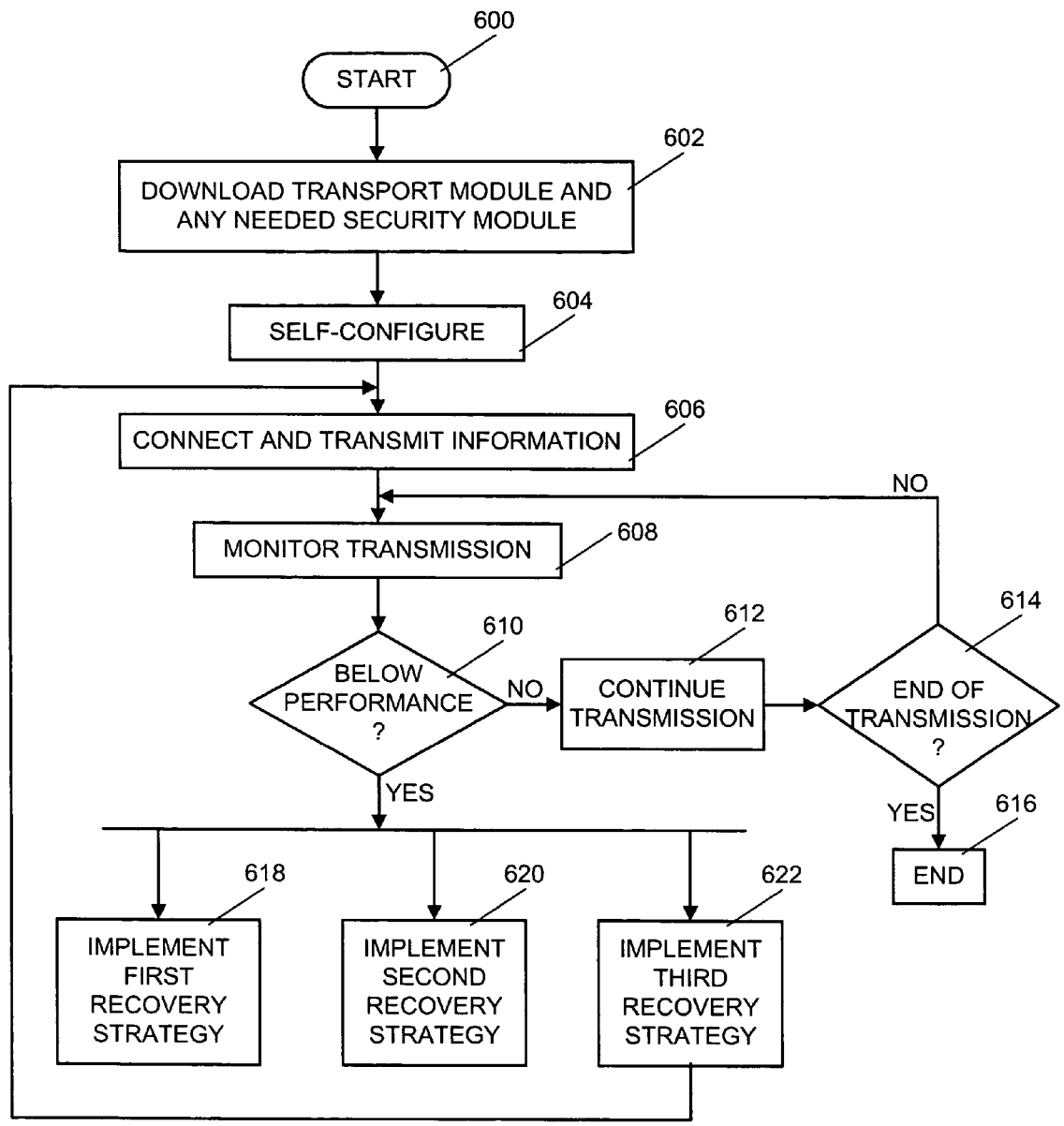
FIG. 6 a flowchart of a process that may be used to implement the invention.

FIG. 6 is a flowchart of a process that may be used by the present invention. The process starts when the adapter 420 is to transfer data between the EIS 430 and the client application 410 (step 600). The adapter may access a descriptor file to configure itself. Using the name of the application that is providing the information or is requested to perform a service, the adapter 420 may parse the descriptor file to determine what transport module as well as needed security module to download. Once the transport and security modules have been determined, they are downloaded. After downloading the requisite modules, the adapter 420 may use configuration parameters such as hostnames, port numbers, transport parameters (e.g. GET vs. POST for HTTP), user authentication (e.g. username/password pairs) from the descriptor file to configure the modules for use. The adapter 420 may then establish a connection with the EIS 430 for the transmission of the information. The adapter 420 will monitor the transmission for efficiency and performance. If performance is within specification (as may be specified in the descriptor file) throughout the transmission, the adapter may not need to reconfigure itself (steps 602 to 616).

If at any time the transmission falls below performance, the adapter may use one of the different recovery strategies that may be available. The first recovery strategy that may be used by the adapter may be to update, re-arrange or turn on/off components etc. in the existing configuration. This strategy may be used first because it may be less time consuming to implement than the other strategies. If after implementing the first recovery strategy, the transmission is still below performance, the adapter 420 may implement a second recovery strategy. A typical second recovery strategy may be a failover strategy. To use a failover strategy, however, an alternative transport protocol must have been made available in the descriptor file. If a failover strategy is used, the adapter may have to re-configure itself.

In any case, if the adapter cannot implement a failover strategy or if after implementing the failover strategy, the transmission is still below performance, the adapter 420 may use a third recovery strategy. The third recovery strategy may entail searching the registry or the network for a suitable alternative measure. If one is found, the adapter 420 may, using Rosettanet, reconfigure itself. However, if a suitable alternative measure is not found, the adapter 420 may continue the transmission using its present configuration (steps 610, 618–622).

The description of the present invention has been presented for purposes of illustration and description, and is not intended to be exhaustive or limited to the invention in the form disclosed. Many modifications and variations will be apparent to those of ordinary skill in the art. Thus, the embodiment was chosen and described in order to best explain the principles of the invention, the practical application, and to enable others of ordinary skill in the art to understand the invention for various embodiments with various modifications as are suited to the particular use contemplated.

What is claimed is:

1. An adapter using stored computer instructions that when executed by a processor transmit information between two devices comprising:

means, using the information to be transmitted, for the adapter to automatically configure itself to transmit the information, the means for the adapter to automatically configure itself includes means for the adapter to download a transport module through which the information can be transmitted:

means for transmitting the information using the downloaded transport module;

means for monitoring the information transmission;

means, if the information transmission falls below a pre-determined performance level, for the adapter, using the information being transmitted, to automatically reconfigure itself by downloading and using a new transport module through which the information can be transmitted; and means for resuming transmission of the information.

2. The adapter of claim 1 wherein the means for the adapter to automatically reconfigure itself further includes means for downloading a security module if the information is to be transmitted securely.

3. The adapter of claim 2 wherein the means for the adapter to automatically reconfigure itself includes means for updating, rearranging or turning on/off components in the existing configuration.

4. The adapter of claim 2 wherein the means for the adapter to automatically reconfigure itself further includes means for downloading a new security module and means for the adapter to reconfigure itself based on the new security module.

5. The adapter of claim 2 wherein the means for the adapter to automatically reconfigure itself includes means for searching for an alternate descriptor file, the descriptor file having instructions for the self-reconfiguration of the adapter.

6. The adapter of claim 2 wherein the means for the adapter to automatically reconfigure itself includes means for monitoring a port of a different computing device and for analyzing an information being transmitted thereto or therefrom to determine whether to self-reconfigure based on the analyzed information.

7. A computer program product on a computer readable medium including computer instructions that, when executed, enables an adapter to transmit information data between two computing devices comprising:
    code means, using the information to be transmitted, for enabling the adapter to automatically configure itself to transmit the information, the code means for the adapter to automatically configure itself includes code means for the adapter to download a transport module through which the information can be transmitted;
    code means for enabling the adapter to transmit the information using the downloaded transport module;
    code means for enabling the adapter to monitor the information transmission;
    code means, if the information transmission falls below a pre-determined performance level, for using the information being transmitted to enable the adapter to automatically reconfigure itself by enabling the adapter to download and use a new transport module through which the information can be transmitted; and
    code means for enabling the adapter to resume transmission of the information.

8. The computer program product of claim 7 wherein the code means for enabling the adapter to configure itself further includes code means for enabling the adapter to download a security module if the information is to be transmitted securely.

9. The computer program product of claim 7 wherein the code means for using the information being transmitted to enable the adapter to automatically reconfigure itself includes code means for enabling the adapter to update, re-arrange or turn on/off components in the existing configuration.

10. The computer program product of claim 7 wherein the code means for using the information being transmitted to enable the adapter to automatically reconfigure itself further includes code means for enabling the adapter to download a new security module and code means for enabling the adapter to reconfigure itself based on the new security module.

11. The computer program of claim 7 wherein the code means for using the information being transmitted to enable the adapter to automatically reconfigure itself includes code means for enabling the adapter to search for an alternate descriptor file, the descriptor file having instructions for the self-reconfiguration of the adapter.

12. The computer program product of claim 7 wherein the code means for using the information being transmitted to enable the adapter to automatically reconfigure itself includes code means for enabling the adapter to monitor a port of a different computing device and for analyzing an information being transmitted thereto or therefrom to determine whether to self-reconfigure based on the analyzed information.

13. A method of transmitting information data between two computing devices comprising the step of:
    using an adapter, the adapter being able to:
        configure itself, using the information to be transmitted, to transmit the information by downloading a transport module to transmit the information;
        transmit the information using the downloaded transport module;
        monitor the information transmission;
        reconfigure itself, using the information being transmitted, if the information transmission falls below a pre-determined performance level by downloading a new transport module to transmit the information; and
        resume transmission of the information using the new transport module.

14. The method of claim 13 wherein the adapter is further able to download a security module if the information is to be transmitted securely.

15. The method of claim 14 wherein the adapter is able to update, re-arrange or turn on/off components in the existing configuration to implement a recovery strategy.

16. The method of claim 14 wherein the adapter is able to download a new security module and reconfigure itself based on the new security module.

17. The method of claim 14 wherein the adapter is able to search for an alternate descriptor file, the descriptor file having instructions for self-reconfiguration.

18. The method of claim 14 wherein the adapter is able to monitor a port of a different computing device and analyze an information being transmitted thereto or therefrom to determine whether to self-reconfigure based on the analyzed information.

* * * * *